(12) United States Patent
Kuhn et al.

(10) Patent No.: US 8,096,579 B2
(45) Date of Patent: Jan. 17, 2012

(54) MOTOR VEHICLE HAVING AN OCCUPANT PROTECTION SYSTEM

(75) Inventors: Andreas Kuhn, Kuchl (AT); Antoni Palau Montino, Salzburg (AT); André Neubohn, Wolfsburg (DE); Christian Weiss, Boehmfeld (DE)

(73) Assignee: Volkswagen AG, Wolfsburg (DE)

( * ) Notice: Subject to any disclaimer, the term of this patent is extended or adjusted under 35 U.S.C. 154(b) by 1005 days.

(21) Appl. No.: 10/576,063

(22) PCT Filed: Oct. 14, 2004

(86) PCT No.: PCT/EP2004/011534
§ 371 (c)(1),
(2), (4) Date: Sep. 8, 2008

(87) PCT Pub. No.: WO2005/035319
PCT Pub. Date: Apr. 21, 2005

(65) Prior Publication Data
US 2008/0319614 A1    Dec. 25, 2008

(30) Foreign Application Priority Data

| Oct. 17, 2003 | (DE) | 103 48 997 |
| Oct. 17, 2003 | (DE) | 103 48 998 |
| Oct. 17, 2003 | (DE) | 103 48 999 |
| Jan. 31, 2004 | (DE) | 10 2004 004 951 |

(51) Int. Cl.
*B60R 21/0132* (2006.01)
(52) U.S. Cl. ............ 280/735; 180/282; 701/45
(58) Field of Classification Search ........... 180/268, 180/282; 280/734, 735; 701/36–38, 45–46, 701/70
See application file for complete search history.

(56) References Cited

U.S. PATENT DOCUMENTS

| 5,583,771 | A | 12/1996 | Lynch et al. |
| 5,684,701 | A | 11/1997 | Breed |
| 6,186,539 | B1* | 2/2001 | Foo et al. ........... 280/735 |
| 6,459,975 | B1 | 10/2002 | Kulm et al. |
| 6,532,508 | B2 | 3/2003 | Heckel et al. |
| 6,600,984 | B1 | 7/2003 | Holzner et al. |
| 6,856,875 | B2 | 2/2005 | Kocher |

(Continued)

FOREIGN PATENT DOCUMENTS

DE    198 54 380    5/2000

(Continued)

OTHER PUBLICATIONS

International Search Report, PCT International Patent Application No. PCT/EP2004/011534, dated Feb. 3, 2005.

(Continued)

*Primary Examiner* — Paul N Dickson
*Assistant Examiner* — James English
(74) *Attorney, Agent, or Firm* — Kenyon & Kenyon LLP

(57) ABSTRACT

A motor vehicle includes at least one first crash sensor for measuring a motion variable of the motor vehicle, arranged in a safety zone of the motor vehicle, and at least one second crash sensor for measuring a motion variable, arranged in a crash zone of the motor vehicle, the motor vehicle including an ignition protection device controllable via an ignition signal and a control unit for ascertaining the ignition signal as a function of the measured motion variables or, in each instance, as a function of a time average of the measured motion variables over at least one first time interval.

11 Claims, 14 Drawing Sheets

U.S. PATENT DOCUMENTS

| | | | |
|---|---|---|---|
| 6,917,866 B2 | 7/2005 | Grotendiek et al. | |
| 2002/0147533 A1 | 10/2002 | Foo et al. | |
| 2002/0188393 A1 | 12/2002 | Yokota et al. | |
| 2003/0074111 A1* | 4/2003 | Ugusa et al. | 701/1 |
| 2003/0155753 A1* | 8/2003 | Breed | 280/735 |
| 2004/0243294 A1* | 12/2004 | Miyata et al. | 701/45 |
| 2006/0167603 A1* | 7/2006 | Brandl et al. | 701/45 |

FOREIGN PATENT DOCUMENTS

| | | |
|---|---|---|
| DE | 100 35 505 | 1/2002 |
| DE | 100 40 111 | 2/2002 |
| DE | 101 16 142 | 4/2002 |
| DE | 101 03 661 | 8/2002 |
| WO | WO 03/013911 | 2/2003 |

OTHER PUBLICATIONS

Written Opinion of the International Searching Authority, PCT International Patent Application No. PCT/EP2004/011534, dated Feb. 3, 2005.

* cited by examiner

MOTOR VEHICLE HAVING AN OCCUPANT PROTECTION SYSTEM

FIELD OF THE INVENTION

The present invention relates to a motor vehicle having an occupant protection system or an occupant protection device, such as an airbag.

BACKGROUND INFORMATION

Airbag systems are described, for example, in the article "Hardware and Mechanics of Real Airbag Control Systems" published on the Internet page www.informatik.uni-dortmund.de/airbag/seminarphase/hardware_vortrag.pdf.

U.S. Pat. No. 5,583,771, U.S. Pat. No. 5,684,701, and U.S. Pat. No. 6,532,508 describe the triggering of an airbag by a neural network as a function of an output signal of an acceleration sensor.

German Published Patent Application No. 198 54 380 describes a method for detecting the severity of a vehicle collision, where the output signals of a plurality of acceleration sensors are supplied to a neural network. In the method, the start of the evaluation of the acceleration-sensor output signals is determined by a trigger signal, which is output by an acceleration sensor when its output signal exceeds a predefined threshold value. This acceleration sensor causes the other acceleration sensors to supply the respective output signal at one and the same time. It is also provided that the output signals of the acceleration sensors be integrated one or two times.

German Published Patent Application No. 100 35 505 describes a method, in which the future time characteristic of the output signal of an acceleration sensor is predicted with the aid of a neural network on the basis of the acceleration-sensor signals at least one defined time.

German Published Patent Application No. 100 40 111 describes a method for producing a triggering decision for restraining devices in a vehicle, where the difference of measured acceleration values is calculated and the magnitude of the difference is subsequently integrated. The integral is compared to at least one threshold value. If the integral does not exceed this threshold value by a predefined time, then the position of a triggering threshold for the measured acceleration or for a speed change derived from it is modified in such a manner, that the triggering sensitivity becomes lower.

Described in German Published Patent Application No. 101 03 661 is a method for sensing lateral impact in a motor vehicle; acceleration sensors, from whose output signals the difference is calculated, being situated on the left and right sides of the vehicle. The differential acceleration signal is integrated or summed up. For the purpose of side-impact sensing, the differential speed signal is compared to a threshold value, which is calculated as a function of the differential acceleration signal.

SUMMARY

Example embodiments of the present invention may provide a motor vehicle that may be improved with regard to occupant protection.

A motor vehicle may include at least one first crash sensor arranged in a safety zone of the motor vehicle, for measuring a motion variable of the motor vehicle, and may include at least one second crash sensor arranged in a crash zone of the motor vehicle, for measuring a (further) or the same motion variable of the motor vehicle. The motor vehicle may include an occupant detection device controllable via an ignition signal, and a control unit for ascertaining the ignition signal as a function of the measured motion variables and/or, in each instance, as a function of a time average of the measured motion variables over at least one time interval.

A crash zone of the motor vehicle within the present context may include, e.g., a region of the motor vehicle which, in the event of a collision of the motor vehicle with an obstacle, may be destroyed prior to a (setpoint) triggering time of the occupant protection device. A safety zone of the motor vehicle within the present context may include, e.g., a region of the motor vehicle which, in the event of a collision of the motor vehicle with an obstacle, is not destroyed or is destroyed after a (setpoint) triggering time of the occupant protection device.

An occupant protection device within the present context may include, e.g., an airbag and/or a belt tensioner. A motion variable of the motor vehicle within the present context may be an acceleration, a speed, or a displacement, or a variable derived from these variables.

A crash sensor within the present context may be an acceleration sensor for measuring an acceleration in one or more directions. A crash sensor within the present context may also be a radar device, an infrared set-up, or a camera. In this case, a motion variable of the motor vehicle may be a distance of the motor vehicle from an obstacle, the first or second derivative of this distance, or another similar variable. A crash sensor within the present context may also be a sensor for measuring a deformation of the motor vehicle. Such a sensor may be a fiber-optic sensor or a sensor described in German Published Patent Application No. 100 16 142. In this case, a motion variable of the motor vehicle may be a deformation of the motor vehicle, the first or second derivative of this deformation, or another similar variable.

A time average within the present context may be an arithmetic mean or a weighted average. In the case of such a weighted average, e.g., more recent values of the motion variable in the relevant time interval may be more heavily weighted than older values of the motion variable in the relevant time interval. An average value within the present context may also be a value proportional to an average value. The average value may be a value proportional to the arithmetic mean. In this context, the average value may be a value proportional to the integral of the motion variable in the relevant time interval or a value proportional to the sum of sampled values of the motion variable in the relevant time interval.

An ignition signal within the present context may be a binary signal, which indicates if an occupant protection device, such as an airbag and/or a belt tensioner, should be triggered. Such an ignition signal within the present context may be a "FIRE/NO-FIRE" signal described in German Published Patent Application No. 100 35 505. An ignition signal within the present context may also be a more complex signal, which indicates the degree (e.g., stage 1 or stage 2) to which an airbag should be fired. In addition, such an ignition signal within the present context may be a crash-severity parameter or an occupant acceleration or loading described in German Published Patent Application No. 100 35 505. An ignition signal within the present context may be, or include, an information item indicating the location and/or the direction of a collision.

The first crash sensor and the second crash sensor may be arranged at least 0.5 m away from each other. The first crash sensor may be connected to the control unit, integrated into the control unit, or arranged in a housing with the control unit.

The control unit may include
at least one first triggering relationship for ascertaining the ignition signal as a function of the measured motion variables and/or, in each instance, as a function of a time average of the measured motion variables over the at least first time interval; and/or
at least one second triggering relationship for ascertaining the ignition signal as a function of the motion variable measured by the first crash sensor and/or as a function of its time average over the at least first time interval, but not as a function of the motion variable measured by the second crash sensor and/or not as a function of its time average over the at least first time interval.

The control unit may include a selection module for selecting the first triggering relationship or the second triggering relationship for instantaneously ascertaining the ignition signal, the selection between the second triggering relationship and the first triggering relationship being made, e.g., as a function of the motion variable measured by the second crash sensor and/or as a function of its time average over the at least first time interval.

The ignition signal may also be ascertainable as a function of a time average of the motion variable measured by the first crash sensor, over a second time interval that is different from the first time interval. Within the present context, a second time interval different from a first time interval may differ from the first time interval in its length and/or its position.

The first time interval and/or the second time interval may be between 1 ms and 200 ms long, e.g., between 4 ms and 32 ms long, and, e.g., between 8 ms and 24 ms long.

The first time interval and/or the second time interval may be staggered by between 1 ms and 50 ms, and, e.g., by between 2 ms and 16 ms.

In a method for manufacturing a motor vehicle, e.g., a motor vehicle having one or more of the above-mentioned features, at least one first crash sensor for measuring a motion variable of the motor vehicle being is arranged in a safety zone of the motor vehicle, at least one second crash sensor for measuring a motion variable of the motor vehicle being is arranged in a crash zone of the motor vehicle, and an occupant detection device controllable via an ignition signal and a control unit for ascertaining the ignition signal as a function of the measured motion variables and/or, in each instance, as a function of a time average of the measured motion variables over at least one first time interval, being is arranged in the motor vehicle.

The following features may be provided:
at least one first triggering relationship for ascertaining the ignition signal as a function of the measured motion variables and/or, in each instance, as a function of a time average of the measured motion variables over the at least first time interval is generated (and, e.g., implemented in the control unit); and/or
at least one second triggering relationship for ascertaining the ignition signal as a function of the motion variable measured by the first crash sensor and/or as a function of its time average over the at least first time interval, but not as a function of the motion variable measured by the second crash sensor and/or not as a function of its time average over the at least first time interval, is generated (and, e.g., implemented in the control unit).

The first triggering relationship and/or the second triggering relationship may be generated (e.g., automatically) as a plurality of comparisons of the motion variables and/or their time averages over the at least first time interval and/or over at least the first time interval and a second time interval different from the first time interval, to a plurality of limiting values.

The limiting values may be automatically determined, the number of comparisons may be automatically determined, the order of the comparisons may be automatically selected, a measured motion variable and/or its time average over the at least first time interval and/or over the at least first time interval and the second time interval may be automatically selected for a comparison, and/or the age of the motion variables and/or of the time averages over the at least first time interval and/or over the at least first time interval and the second time interval may be automatically selected for the comparisons.

The first triggering relationship and/or the second triggering relationship may be generated as a function of the measured motion variable or its time average over the at least first time interval and/or over at least the first time interval and the second time interval of a situation, for which a setpoint triggering time of the occupant protection device is known, but the measured motion variable or its time average over the at least first time interval and/or over at least the first time interval and the second time interval being disregarded in a training-suppression time interval prior to the setpoint triggering time of the occupant protection device, around the setpoint triggering time of the occupant protection device, or after the setpoint triggering time of the occupant protection device, during the generation of the first triggering relationship and/or the second triggering relationship.

The measured motion variable and/or its time average over the at least first time interval and/or over the at least first time interval and the second time interval may be disregarded in a training-suppression time interval prior to the setpoint triggering time of the occupant protection device, when the first triggering relationship and/or the second triggering relationship is generated.

The training-suppression time interval may be between 1 ms and 40 ms long, e.g., between 2 ms and 10 ms long, and, e.g., 5 ms long.

A motor vehicle in the present context may include, e.g., a land vehicle that may be used individually in road traffic, motor vehicles in the present context are not restricted to land vehicles having an internal combustion engine.

Further features and details of example embodiments of the present invention are described in more detail below with reference to the appended Figures.

DETAILED DESCRIPTION

Figure 1:
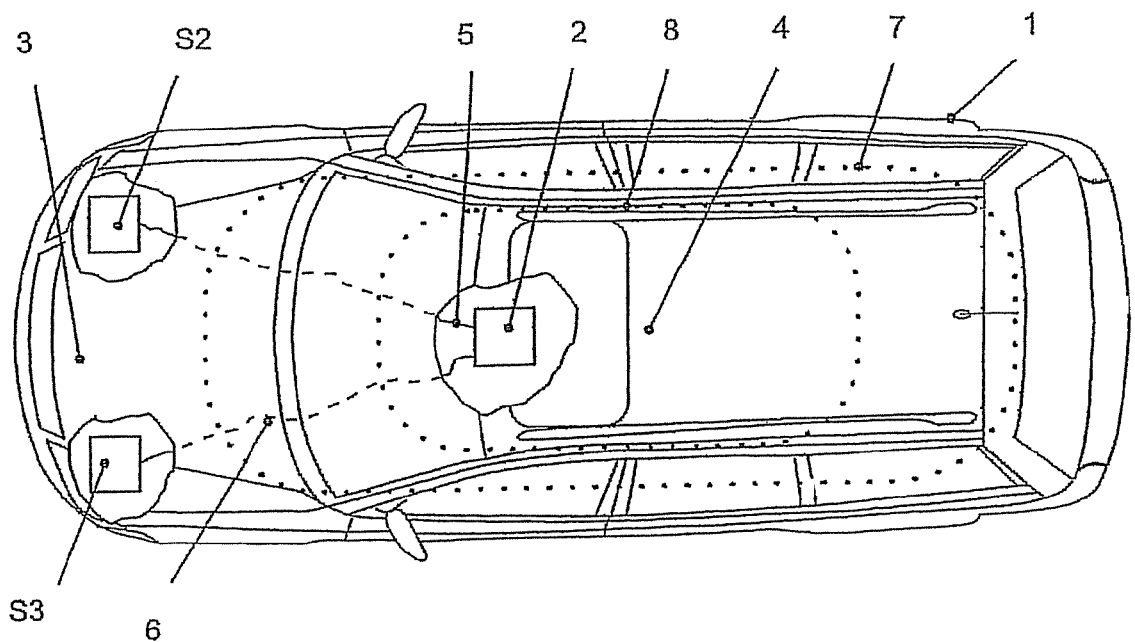
FIG. 1 is a plan view of a motor vehicle.
Figure 2:
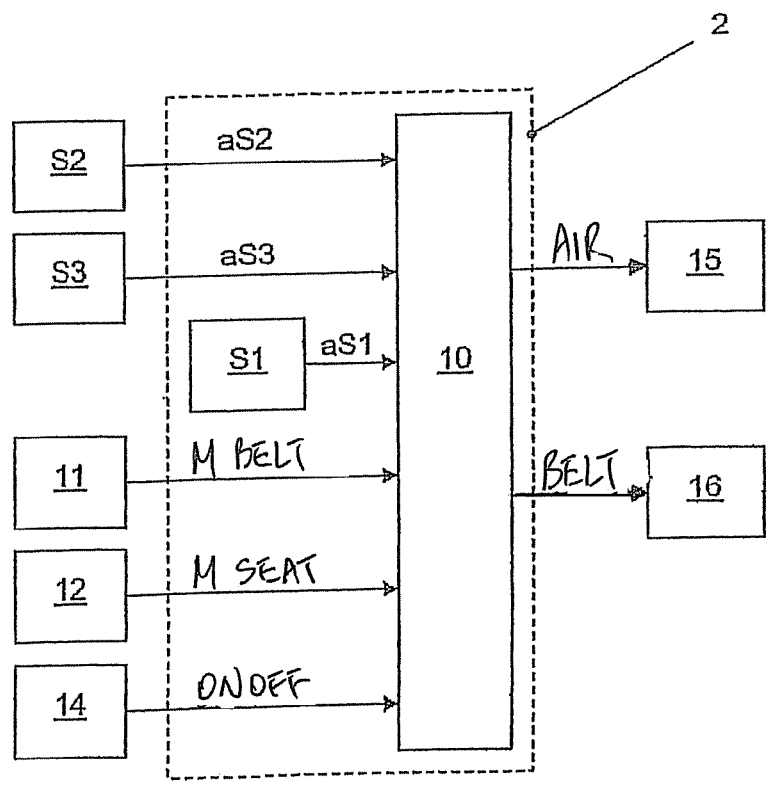
FIG. 2 illustrates an exemplary embodiment of an occupant protection system.

FIG. 1 is a plan view of a motor vehicle 1 having an occupant protection system, which is illustrated in FIG. 2 in the form of a block diagram. The occupant protection system includes at least one airbag 15, see FIG. 2, and/or a belt tensioner 16, see FIG. 2. The occupant protection system additionally includes a control unit 2 for triggering airbag 15 and/or belt tensioner 16, as well as a crash sensor S2 integrated into the right front end of motor vehicle 1 and a crash sensor S3 integrated into the left front end of motor vehicle 1. Crash sensors S2 and S3 are connected to control unit 2 by leads 5 and 6.

Crash sensors S2 and S3, as well as an additional crash sensor S1 integrated into control unit 2, as illustrated in FIG. 2, may take the form of acceleration sensors. Suitable acceleration sensors are described, for example, in chapter 3.2, 'Acceleration Sensor,' of the article "Hardware and Mechanics of Real Airbag Control Systems" published on the Internet page www.informatik.uni-dortmund.de/airbag/seminarphase/hardware_vortrag.pdf. Examples of suitable acceleration sensors include Bosch SMB060, Bosch PAS3, or Bosch UPF1. A suitable acceleration sensor may include, for example, a Bessel low-pass filter having a cutoff frequency of, e.g., 400 Hz. Crash sensors S1, S2, and S3 supply acceleration values aS1, aS2, and aS3, respectively, as output signals.

Crash sensors S2 and S3 are arranged in a crash zone 3, which is bounded by the outer contours of motor vehicle 1 and a dotted line designated by reference numeral 7. In this context, crash zone 3 defines a region of motor vehicle 1, which, in the event of a collision of motor vehicle 1 with an obstacle, may be destroyed prior to a triggering time of airbag 15 and/or belt tensioner 16. Control unit 2 is arranged with crash sensor S1 in a safety zone 4, which is bounded by a dotted line designated by reference numeral 8. In this context, safety zone 4 defines a region of the motor vehicle, which, in the event of a collision of motor vehicle 1 with an obstacle, is not destroyed or is only destroyed after a triggering time of airbag 15 and/or belt tensioner 16. Within the present context, a collision of motor vehicle 1 with an obstacle is, e.g., a collision from whose consequences an occupant protection device, such as airbag 15 or belt tensioner 16, should protect the occupant or occupants of motor vehicle 1. In the described exemplary embodiment, such a collision is a collision with a frontal component.

Actual crash zone 3 or actual safety zone 4 according to the above-mentioned definition is a function of the individual design or shape of the motor vehicle considered. Therefore, crash zone 3 and safety zone 4 of motor vehicle 1 may not specify any universally applicable description of the position of crash zones and safety zones within the meaning of the above-mentioned definition. The position of crash zone 3 and safety zone 4 illustrated in FIG. 1 is used solely for illustrative purposes.

The occupant protection system further includes a belt sensor 11 for detecting if a seat belt is being used, and for outputting a corresponding belt information item MBELT. The occupant protection system further includes a seat-occupancy sensor 12 for detecting if, or how, a seat is occupied, and for outputting a corresponding seat-occupancy information item MSEAT. An example of a suitable seat-occupancy sensor is a pressure sensor integrated into the seat. Also suitable is an infrared scanning system described in chapter 3.3, "Interior Sensing," of the article "Hardware and Mechanics of Real Airbag Control Systems" published on the Internet page www.informatik.uni-dortmund.de/airbag/seminarphase/hardware_vortrag.pdf. Infrared scanning and fuzzy logic not only allow seat occupancy to be detected, but also allow a determination as to whether the seat occupant is an object, such as a purse, or a person. To this end, a line of, e.g., eight or more light-emitting diodes above the seat emit infrared light, and a CCD matrix of 64 pixels records the scene illuminated in this manner. These charged coupled devices, abbreviated CCD, are made up of photodiodes and amplifier elements in matrix configurations. In this context, incident light releases charge carriers in each instance. A signal generated in this manner is amplified, processed, and stored. This procedure is repeated at different angles, and the seat is scanned in this manner. Image-processing algorithms and fuzzy-logic algorithms detect contours of objects and persons from these signals.

It may also be provided that the occupant-protection system include a control element 14 for activating or deactivating airbag 15. A corresponding switching signal is designated by reference character ONOFF.

Control unit 2 includes a control module 10 for calculating and outputting an ignition signal AIR for airbag 15 and/or an ignition signal BELT for belt tensioner 16 as a function of acceleration values aS1, aS2, and aS3, belt information item MBELT, seat-occupancy information item MSEAT, and switching signal ONOFF.

Figure 3:
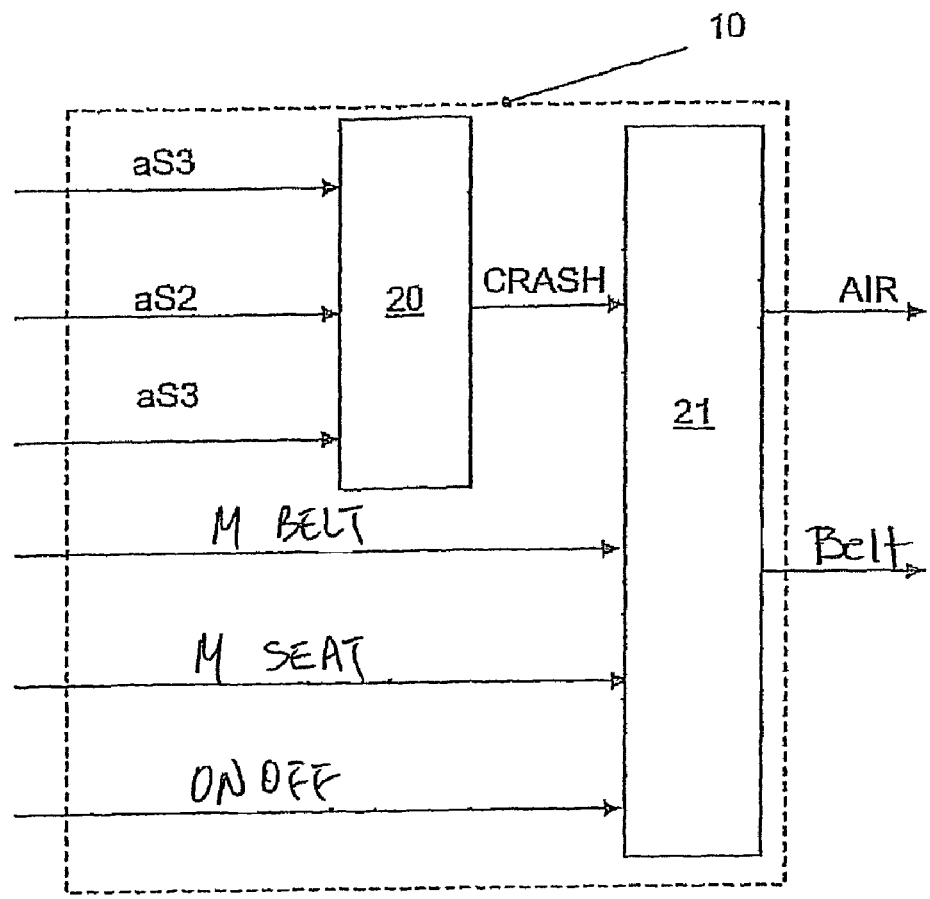
FIG. 3 illustrates an exemplary embodiment of a control module.

FIG. 3 illustrates an exemplary embodiment of control module 10. Control module 10 includes a triggering module 20 for calculating and outputting an ignition recommendation CRASH as a function of acceleration values aS1, aS2, and aS3. Control module 10 additionally includes a firing table 21 for calculating and outputting ignition signal AIR for airbag 15 and/or ignition signal BELT for belt tensioner 16 as a function of ignition recommendation CRASH, belt information item MBELT, seat-occupancy information item MSEAT, and/or switching signal ONOFF. Thus, it may be provided that ignition signal AIR only be equal to ignition recommendation CRASH when a corresponding seat is occupied by a person of a specific size, and that ignition signal AIR be otherwise equal to 0.

Both ignition recommendation CRASH and ignition signals AIR and BELT may be ignition signals within the present context. Both ignition recommendation CRASH and ignition signals AIR and BELT may be a binary signal, e.g., one corresponding to the "FIRE/NO-FIRE" signal described in German Published Patent Application No. 100 35 505, the binary signal indicating whether an occupant protection device, such as an airbag and/or a belt tensioner, should be triggered. Both ignition recommendation CRASH and ignition signals AIR and BELT may also be a more complex signal. Both ignition recommendation CRASH and ignition signal AIR may be, for example, a more complex signal which indicates the degree (e.g. stage 1 or stage 2) to which airbag 15 should be fired. Both ignition recommendation CRASH and ignition signal AIR may additionally include, for example, a crash-severity parameter described in German Published Patent Application No. 100 35 505 or an occupant acceleration or occupant loading. It may be provided that both ignition recommendation CRASH and ignition signals AIR and BELT may indicate the location and/or the direction of a collision.

Figure 4:
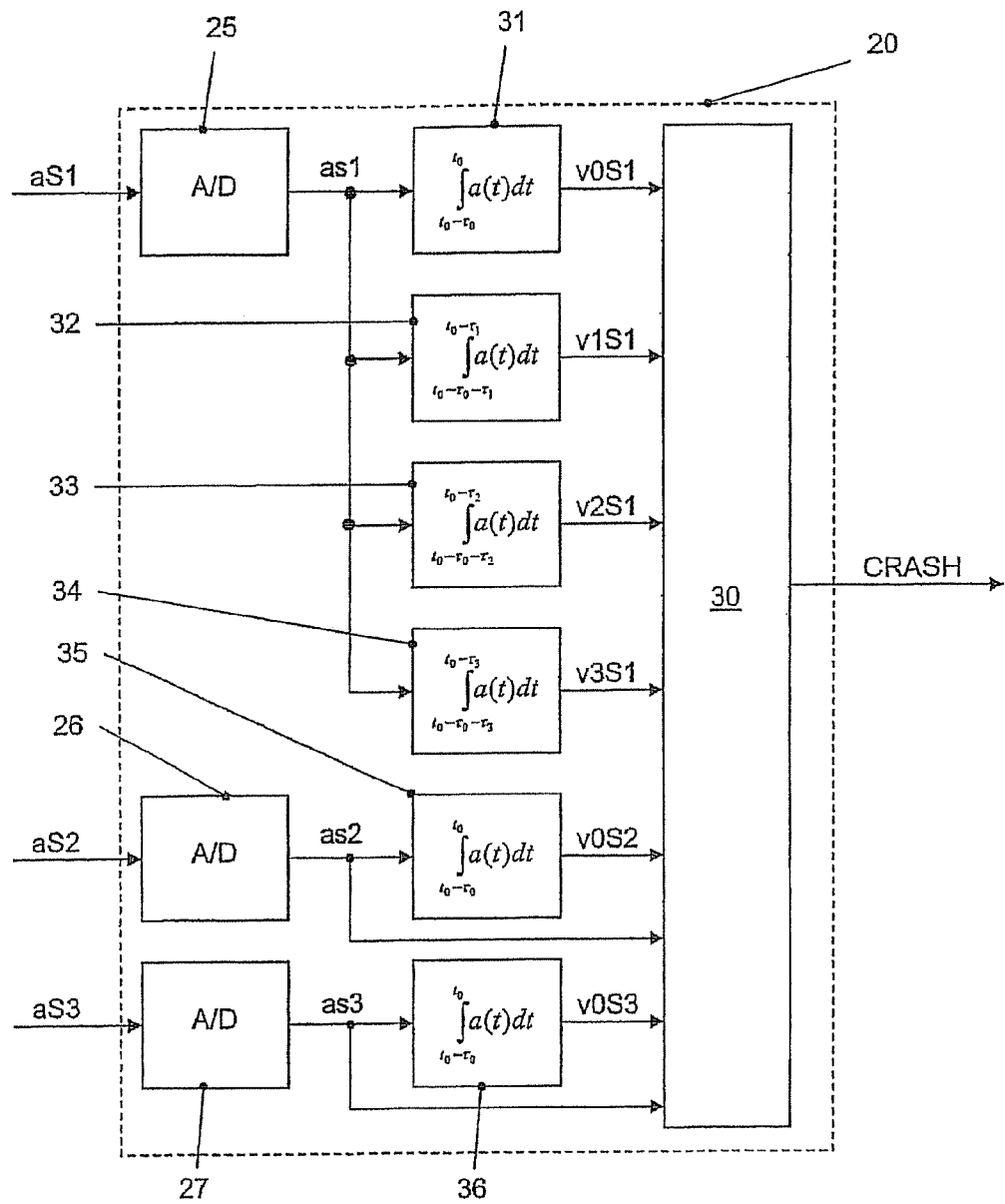
FIG. 4 illustrates an exemplary embodiment of a triggering module.

FIG. 4 illustrates an exemplary embodiment of triggering module 20. Triggering module 20 includes an analog-to-digital converter 25 for sampling acceleration value aS1 and outputting a sampled acceleration value as1, an analog-to-digital converter 26 for sampling acceleration value aS2 and outputting a sampled acceleration value as2, and an analog-to-digital converter 27 for sampling acceleration value aS3 and outputting a sampled acceleration value as3. The sampling frequency of the $\Delta t$ of analog-to-digital converters 25, 26, and 27 may be, for example, 4 kHz. Triggering module 20 additionally includes (digital) integrators 31, 32, 33, 34, 35, and 36.

Figure 5:
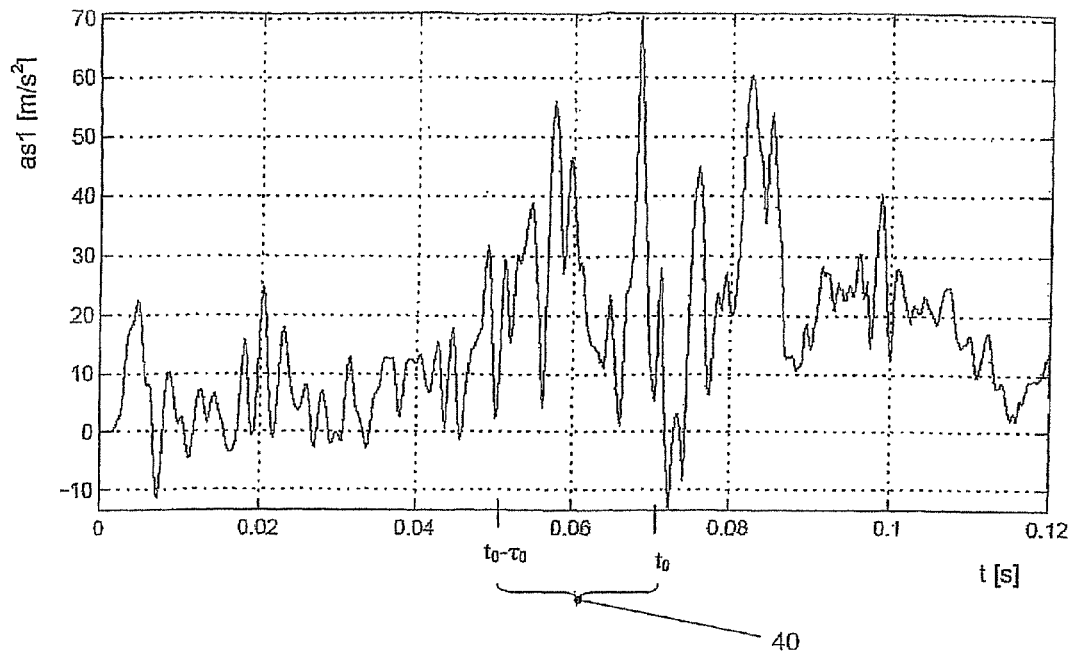
FIG. 5 illustrates an exemplary embodiment of an output signal of a crash sensor.

Using integrator 31, a pseudospeed value v0S1 at time to is ascertained according to $$v0S1 = \int_{t_0-\tau_0}^{t_0} as1 \cdot dt$$

where $\tau_0$ is the length of a time interval $[t_0-\tau_0, t_0]$ or 40 (cf. FIG. 5). Time to designates the current time, i.e., the current value of time t.

Using integrator 32, a pseudospeed value v1S1 at a time $t_0-\tau_1$ is ascertained according to $$v1S1 = \int_{t_0-\tau_0-\tau_1}^{t_0-\tau_1} as1 \cdot dt$$

Using integrator 33, a pseudospeed value v2S1 at a time $t_0-\tau_2$ is ascertained according to $$v2S1 = \int_{t_0-\tau_0-\tau_2}^{t_0-\tau_2} as1 \cdot dt$$

Using integrator 34, a pseudospeed value v3S1 at a time $t_0-\tau_3$ is ascertained according to $$v3S1 = \int_{t_0-\tau_0-\tau_3}^{t_0-\tau_3} as1 \cdot dt$$

Using integrator 35, a pseudospeed value v0S2 at time $t_0$ is ascertained according to $$v0S2 = \int_{t_0-\tau_0}^{t_0} as2 \cdot dt$$

Using integrator 36, a pseudospeed value v0S3 at time $t_0$ is ascertained according to $$v0S3 = \int_{t_0-\tau_0}^{t_0} as3 \cdot dt$$

Figure 6:
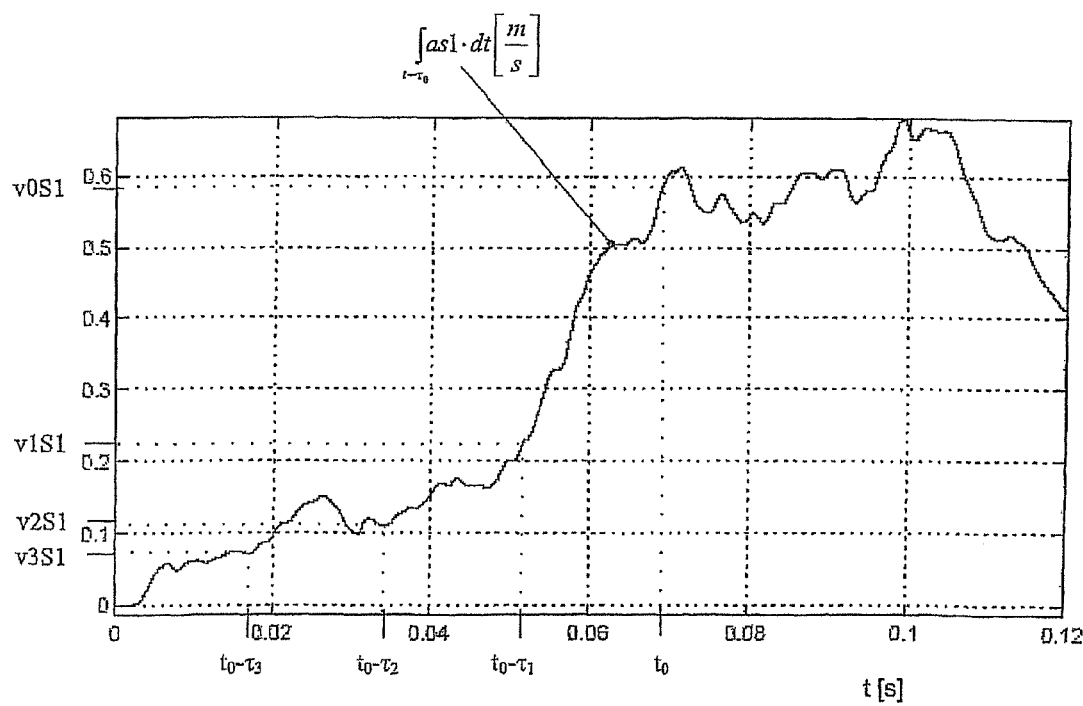
FIG. 6 illustrates the integral of the output signal illustrated in FIG. 5, in a time interval.

FIG. 5 and FIG. 6 illustrate the effect of integrators 31, 32, 33, 34, 35, and 36. In this context, FIG. 5 illustrates an example of a curve of (sampled) acceleration value as1 versus time t in the event of a frontal collision of motor vehicle 1 with an obstacle. FIG. 6 illustrates an example of a curve of pseudospeed value v0S1 for $\tau_0$=24 ms.

In the exemplary embodiment illustrated in FIG. 6, $\tau_1$ is 17 ms, $\tau_2$ is 34 ms, and $\tau_3$ is 51 ms, $\tau_1$ may be 8 ms, $\tau_2$ may be 16 ms, and $\tau_3$ may be 24 ms.

Pseudospeed values v0S1, v1S1, v2S1, v3S1, v0S2, and v0S3 are examples of time averages.

Figure 7:
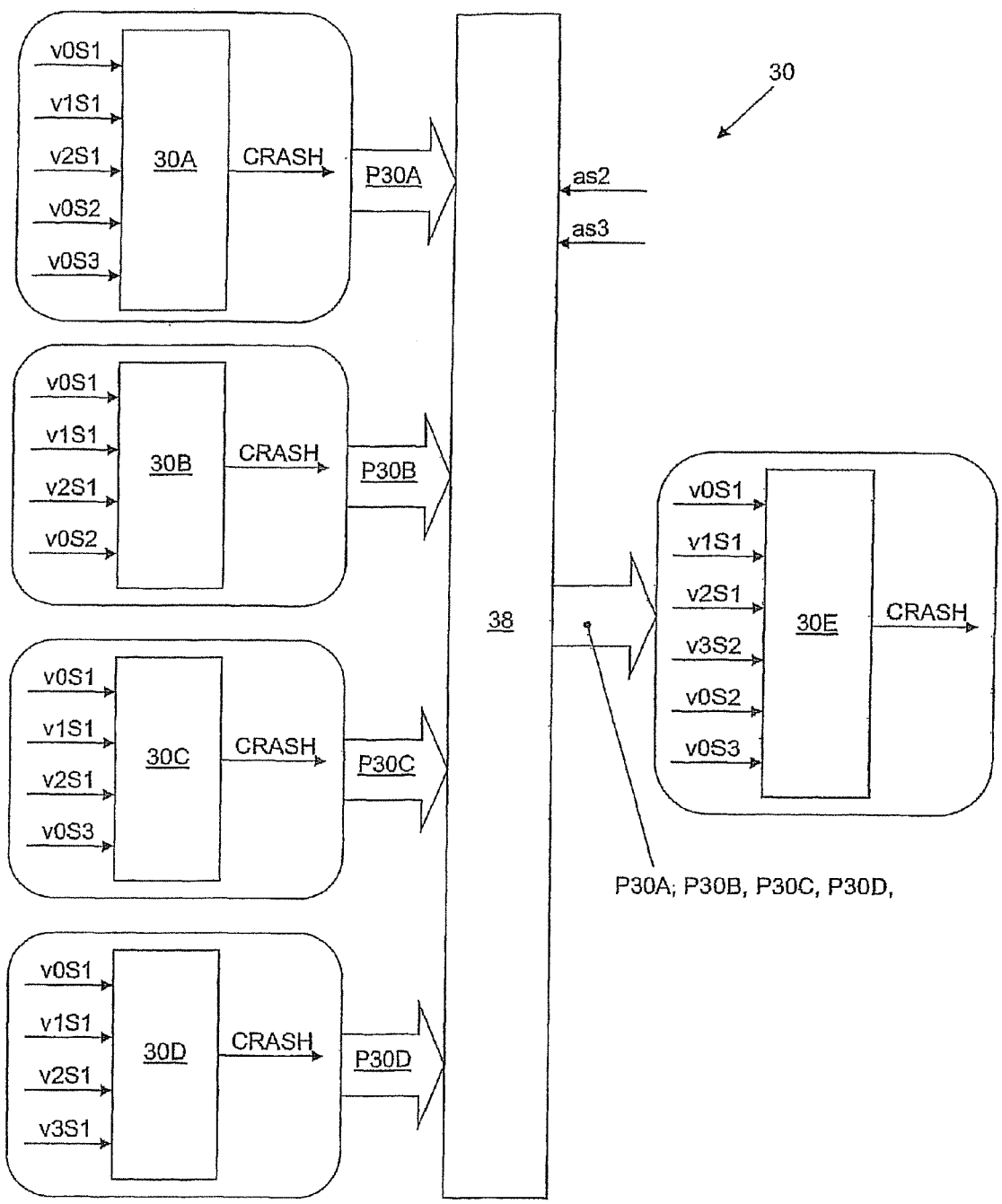
FIG. 7 illustrates an exemplary embodiment of a trigger generator.

Triggering module 20 further includes a trigger generator 30 for generating ignition recommendation CRASH, illustrated in more detail in FIG. 7. Trigger generator 30 includes a triggering relationship 30A for generating ignition recommendation CRASH as a function of pseudospeed values v0S1, v1S1, v2S1, v0S2, and v0S3, a triggering relationship 30B for generating ignition recommendation CRASH as a function of pseudospeed values v0S1, v1S1, v2S1, and v0S2, a triggering relationship 30C for generating ignition recommendation CRASH as a function of pseudospeed values v0S1, v1S1, v2S1, and v0S3, and a triggering relationship 30D for generating ignition recommendation CRASH as a function of pseudospeed values v0S1, v1S1, v2S1, and v3S1.

Trigger generator 30 additionally includes a selection module 38 for selecting a triggering relationship 30A, 30B, 30C, or 30D to use as a current triggering relationship 30E for generating current ignition recommendation CRASH as a function of pseudospeed values v0S1, v1S1, v2S1, v3S1, v0S2, and v0S3. If selection module 38 detects that crash sensor S2 supplies acceleration values aS2 (and therefore that analog-to-digital converter 25 supplies sampled acceleration values as2), and that crash sensor S3 supplies acceleration values as3 (and therefore that analog-to-digital converter 26 supplies sampled acceleration values as3), then selection module 38 selects triggering relationship 30A to use as a current triggering relationship 30E for generating current ignition recommendation CRASH.

If selection module 38 detects that crash sensor S2 supplies acceleration values aS2 (and therefore that analog-to-digital converter 25 supplies sampled acceleration values as2), but that crash sensor S3 does not supply any acceleration values as3 (and therefore that analog-to-digital converter 26 does not supply any sampled acceleration values as3), then selection module 38 selects triggering relationship 30B to use as a current triggering relationship 30E for generating current ignition recommendation CRASH.

If selection module 38 detects that crash sensor S3 supplies acceleration values aS3 (and therefore that analog-to-digital converter 26 supplies sampled acceleration values as3), but that crash sensor S2 does not supply any acceleration values as2 (and therefore that analog-to-digital converter 25 does not supply any sampled acceleration values as2), then selection module 38 selects triggering relationship 30C to use as a current triggering relationship 30E for generating current ignition recommendation CRASH.

If selection module 38 detects that crash sensor S2 does not supply any acceleration values aS2 (and therefore that analog-to-digital converter 25 does not supply any sampled acceleration values as2), and that crash sensor S3 does not supply any acceleration values as3 (and therefore that analog-to-digital converter 26 does not supply any sampled acceleration values as3), then selection module 38 selects triggering relationship 30D to use as a current triggering relationship 30E for generating current ignition recommendation CRASH.

The selection between triggering relationship 30A, 30B, 30C, or 30D as triggering relationship 30E may be carried out by selecting between parameters P30A for defining triggering relationship 30A, parameters P30B for defining triggering relationship 30B, parameters P30C for defining triggering relationship 30C, and parameters P30D for defining triggering relationship 30D, to transfer to triggering relationship 30E.

Figure 8:
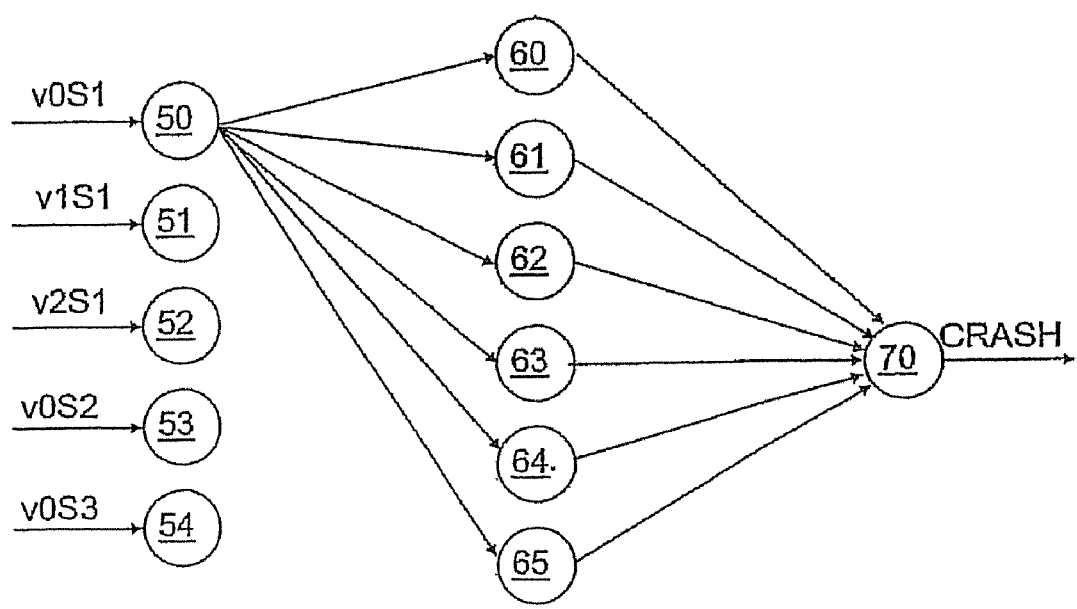
FIG. 8 illustrates an exemplary embodiment of a neural network.

Triggering relationships 30A, 30B, 30C, and 30D (or a part of triggering relationships 30A, 30B, 30C, and 30D) may, for example, take the form of a neural network, as illustrated in FIG. 8 as an exemplary embodiment for implementing triggering relationship 30A. The neural network illustrated in FIG. 8 includes five input nodes 50, 51, 52, 53, 54, six covered nodes 60, 61, 62, 63, 64, 65, and an output node 70, each input node 50, 51, 52, 53, 54 being connected to each covered node 60, 61, 62, 63, 64, 65, and each covered node 60, 61, 62, 63, 64, 65 being connected to output node 70. However, for reasons of clarity, FIG. 8 does not illustrate all of the connections between input nodes 50, 51, 52, 53, 54 and covered nodes 60, 61, 62, 63, 64, 65.

Pseudospeed value v0S1 is the input variable input into input node 50, pseudospeed value v1S1 is the input variable input into input node 51, pseudospeed value v2S1 is the input variable input into input node 52, pseudospeed value v0S2 is the input variable input into input node 53, and pseudospeed value v0S3 is the input variable input into input node 54. The output variable from output node 70 is ignition recommendation CRASH.

Parameters P3OA, P3OB, P3OC, and P3OD may be, for example, the gains of nodes 50, 51, 52, 53, 54, 60, 61, 62, 63, 64, 65, and 70 of the neural network.

Details regarding neural networks may be found in U.S. Pat. No. 5,583,771, U.S. Pat. No. 5,684,701, and the documents "Techniques And Application Of Neural Networks", Taylor, M. and Lisboa, Ellis Horwood, West Sussex, England, 1993, "Naturally Intelligent Systems", Caudill, M. and Butler, G., MIT Press, Cambridge, 1990, and "Digital Neural Networks", Kung, S. Y., PTR Prentice Hall, Englewood Cliffs, N.J., 1993, cited in U.S. Pat. No. 5,684,701.

TABLE 1

```
/* Evaluation function */
int evaluate_Action(double *x)
{
    int CRASH;
    if (v0S3 < δ_{v0S3} ) {
        if (v0S2 < δ_{v0S2} ) {
            if (v2S1 < δ_{v2S1} ) {
                if (v0S1 < δ_{v0S1} ) {
                    CRASH = 0;
                } else {
                    if (v0S3 < δ_{v0S3, 2} ) {
                        CRASH = 0;
                    } else {
                        if (v0S1 < δ_{v0S1, 2} ) {
                            if (v1S1 < δ_{v1S1} ) {
                                CRASH = 1;
                            } else {
                                CRASH = 0;
                            }
                        } else {
                            CRASH = 1;
                        }
                    }
                }
```

TABLE 1-continued

```
            } else {
                if (v0S2 < δ_{v0S2, 2} ) {
                    CRASH = 0;
                } else {
                    if (v0S3 < δ_{v0S3, 3} ) {
                        CRASH = 0;
                    } else (
                        CRASH = 1;
                    }
                }
            }
        } else {
            CRASH = 1;
        }
    } else {
        CRASH = 1;
    }
    return (CRASH);
}
```

As an alternative, triggering relationships 30A, 30B, 30C, and 30D (or a part of triggering relationships 30A, 30B, 30C, and 30D) may be arranged, for example, as a sequence of comparisons to limiting values. Table 1 illustrates such a sequence of comparisons to limiting values as an example of a possible implementation of triggering relationship 30A, the code illustrated in Table 1 having been automatically generated by a method explained with reference to FIG. 10. For the code illustrated in Table 1, $t_1$ is 4 ms, $t_2$ is 8 ms, and to is 24 ms. Parameters P30A, P30B, P30C, and P30D may also be, for example, the code illustrated in Table 1.

Figure 9:
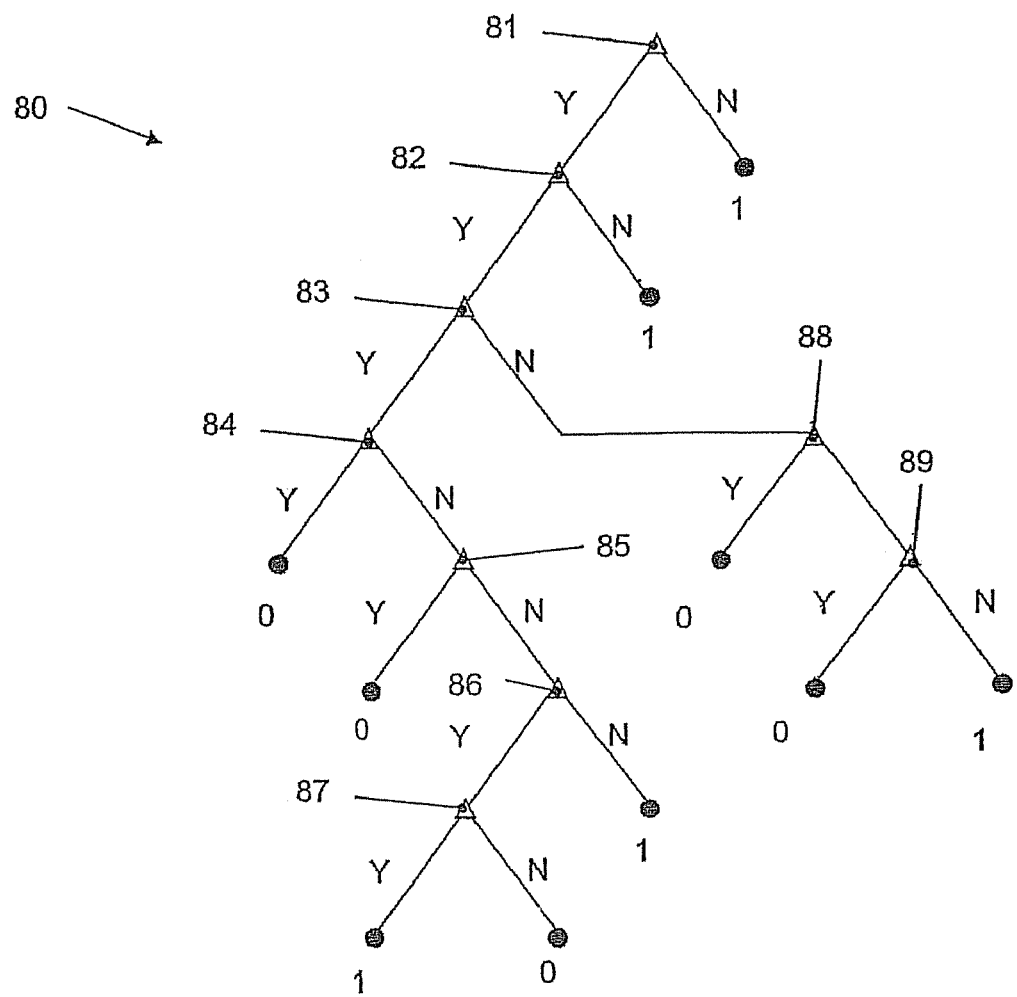
FIG. 9 illustrates an exemplary embodiment of a decision tree.

FIG. 9 illustrates the code of Table 1, represented as a decision tree 80. In this context, reference numeral 81 denotes the inquiry as to whether v0S3 is less than a limiting value $\delta_{v0S3}$. Reference numeral 82 denotes the inquiry as to whether v0S2 is less than a limiting value $\delta_{v0S2}$. Reference numeral 83 denotes the inquiry as to whether v2S1 is less than a limiting value $\delta_{v2S1}$. Reference numeral 84 denotes the inquiry as to whether v0S2 is less than a limiting value $\delta_{v0S1}$. Reference numeral 85 denotes the inquiry as to whether v0S3 is less than a limiting value $\delta_{v0S3,2}$. Reference numeral 86 denotes the inquiry as to whether v0S1 is less than a limiting value $\delta_{v0S1,2}$. Reference numeral 87 denotes the inquiry as to whether v1S1 is less than a limiting value $\delta_{v1S1}$. Reference numeral 88 denotes the inquiry as to whether v0S2 is less than a limiting value $\delta_{v0S2,2}$. Reference numeral 89 denotes the inquiry as to whether v0S3 is less than a limiting value $\delta_{v0S3,3}$.

Figure 10:
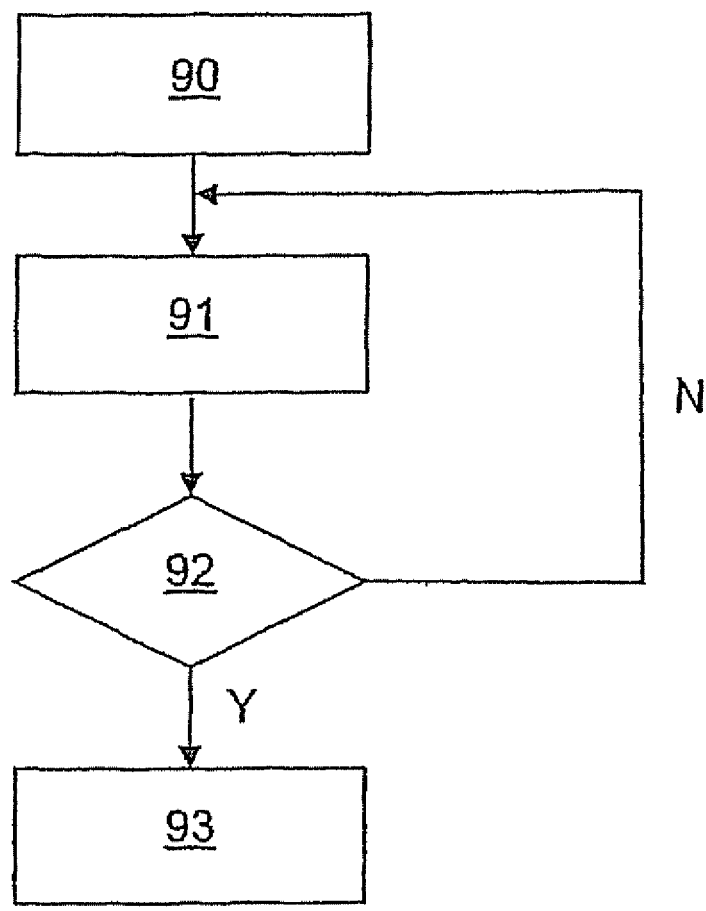
FIG. 10 illustrates an exemplary embodiment of a method for manufacturing a motor vehicle.

FIG. 10 illustrates a method for manufacturing motor vehicle 1. To this end, a test prototype of motor vehicle 1 is initially produced in a step 90, crash sensors corresponding to crash sensors S1, S2, S3 for measuring the motion variable of motor vehicle 1 being installed in the motor vehicle. The test prototype of motor vehicle 1 is subjected to a crash test, where the output signals of the crash sensors corresponding to crash sensors S1, S2, S3 are measured. A database is constructed from these output signals and the output signals of further crash tests. In this data/base, pseudospeed values v0S1, v1S1, v2S1, v3S1, v0S2, v0S3 generated from the above-mentioned output signals of the crash sensors corresponding to crash sensors S1, S2, S3 are stored together with a triggering information item CRASHTRUE according to a method illustrated in FIG. 4, FIG. 16, FIG. 17, and FIG. 18, the triggering information item indicating a setpoint ignition time or a setpoint triggering time. Triggering information item CRASH-TRUE may indicate, for example, a setpoint ignition time of airbag 15.

Subsequent to step 90 is a step 91, in which triggering relationships 30A, 30B, 30C und 30D are generated on the basis of the data stored in the database. However, when triggering relationships 30A, 30B, 30C, and 30D are generated, pseudospeed values v0S1, v1S1, v2S1, v3S1, v0S2, and v0S3 are disregarded in a training-suppression time interval around the setpoint triggering time of airbag 15 or belt tensioner 16, in a training-suppression time interval after the setpoint triggering time of airbag 15 or belt tensioner 16, or, e.g., in a training-suppression time interval prior to the setpoint triggering time of airbag 15 or belt tensioner 16, as explained below with reference to FIG. 11, FIG. 12, FIG. 13, FIG. 14, and FIG. 15.

Figure 11:
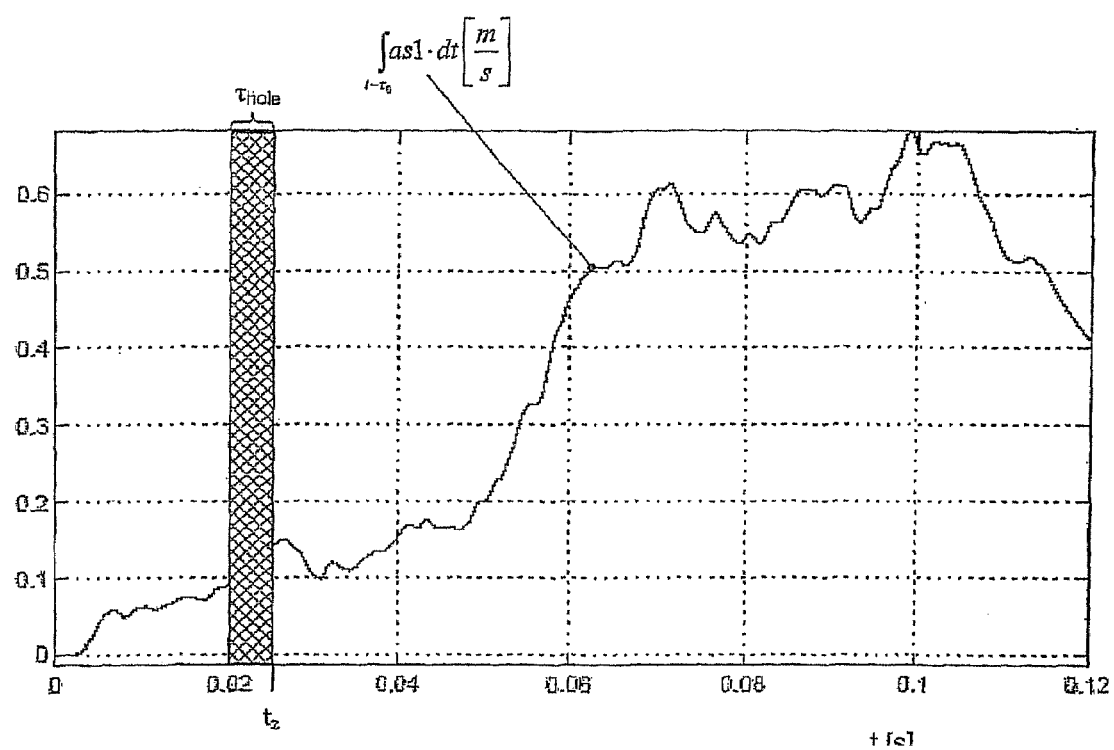
FIG. 11 illustrates the integral illustrated in FIG. 6, having a training-suppression time interval.

FIG. 11 illustrates the pseudospeed value according to FIG. 6, along with a corresponding training-suppression time interval $t_{hole}$, which is prior to a setpoint triggering time of airbag 15 or belt tensioner 16 designated by $t_z$. In this context, setpoint triggering time $t_z$ may be the time by which airbag 15 or belt tensioner 16 should be triggered at the latest. Training-suppression time interval $t_{hole}$ is between 1 ms and 40 ms long, e.g., between 2 ms and 10 ms long, and, e.g., approximately 5 ms long. In the present exemplary embodiment, training-suppression time interval $t_{hole}$ is 5 ms.

Figure 12:
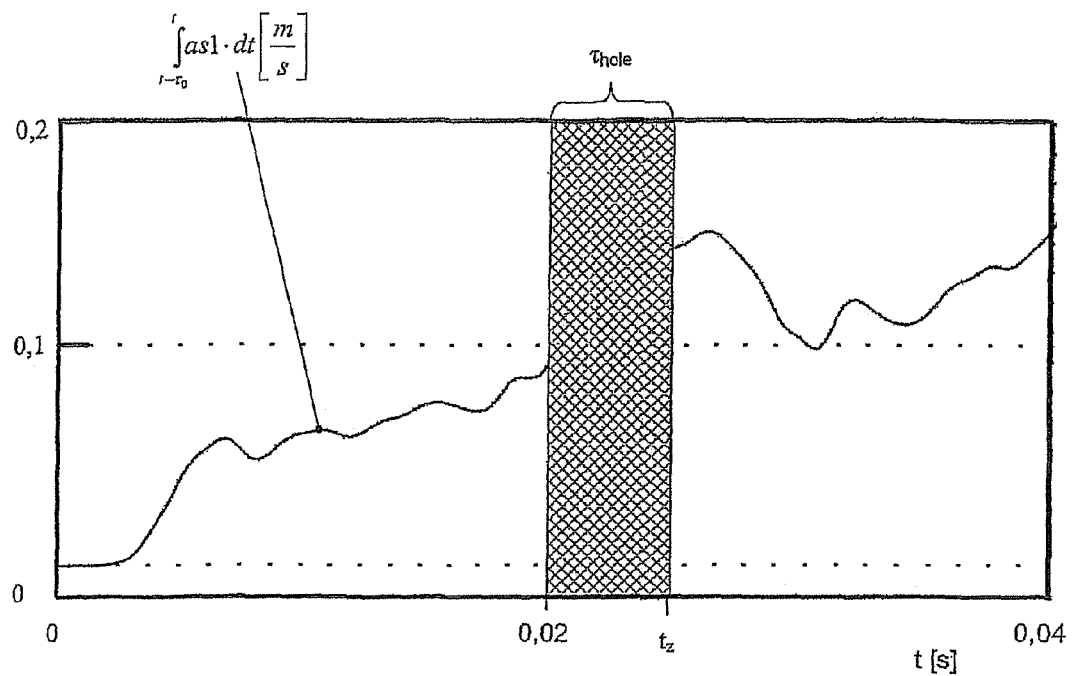
FIG. 12 illustrates a section of the integral illustrated in FIG. 11.
Figure 13:
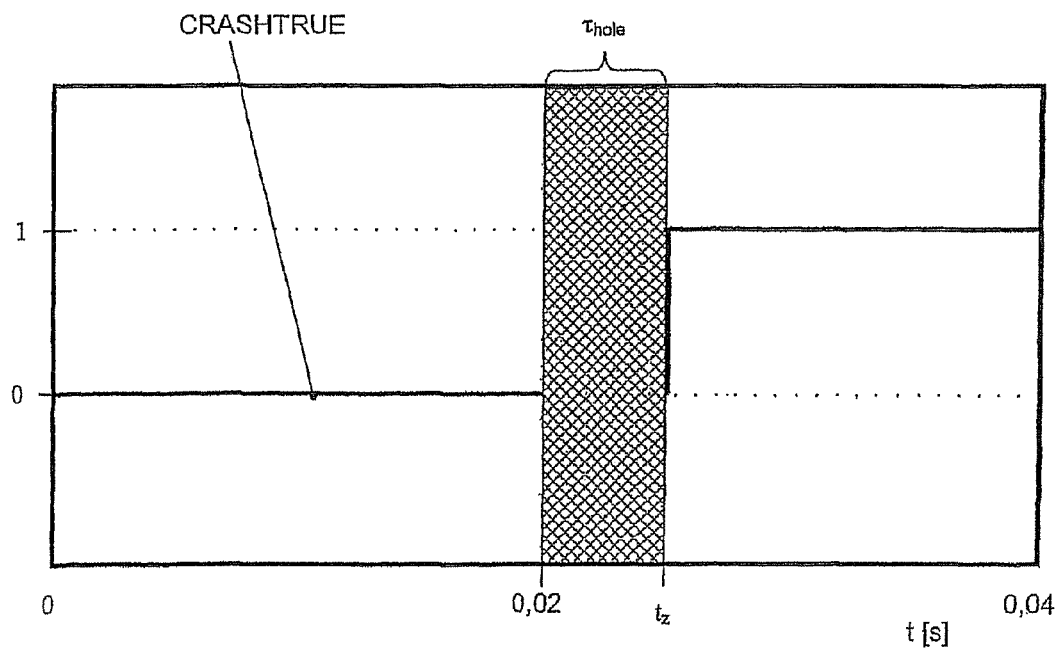
FIG. 13 illustrates a triggering information item having a training-suppression time interval.

FIG. 12 illustrates a section of FIG. 11 for the area between 0 ms and 40 ms. FIG. 13 illustrates corresponding triggering information item CRASHTRUE. Triggering information item CRASHTRUE is equal to 0 prior to setpoint triggering time $t_z$ and equal to 1 after setpoint triggering time $t_z$, but, in the same manner as the pseudospeed value of FIG. 12, it is disregarded in training-suppression time interval $t_{hole}$ prior to setpoint triggering time $t_z$ for the generation of triggering relationships 30A, 30B, 30C, and 30D. This may be accomplished, for example, by removing the pseudospeed values and triggering information item CRASHTRUE from the data in training-suppression time interval $t_{hole}$.

Figure 14:
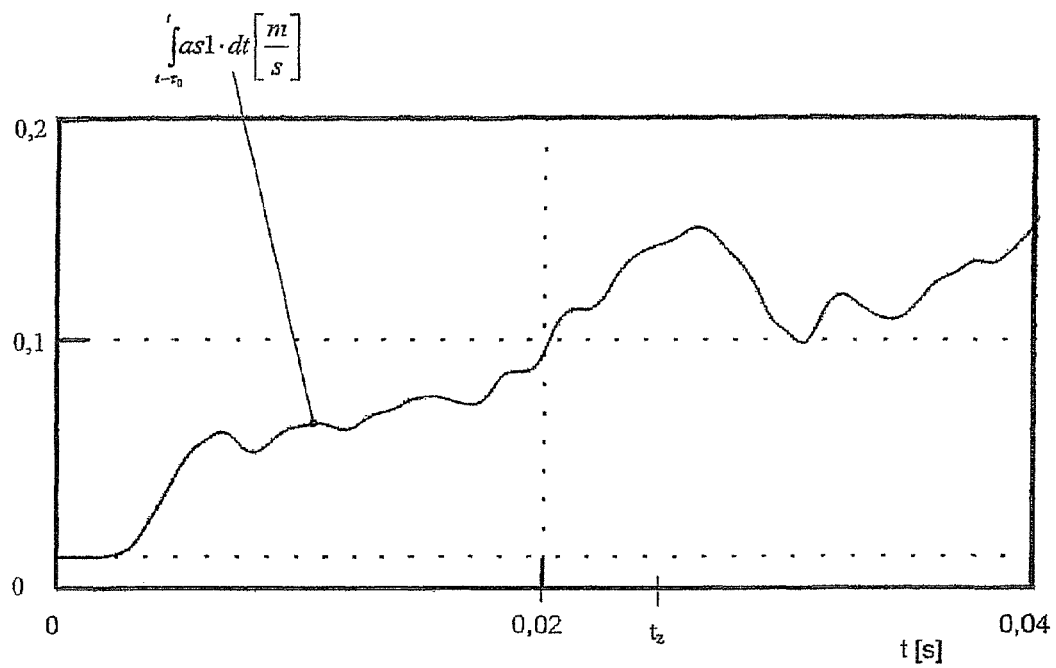
FIG. 14 illustrates a section of the integral illustrated in FIG. 6.
Figure 15:
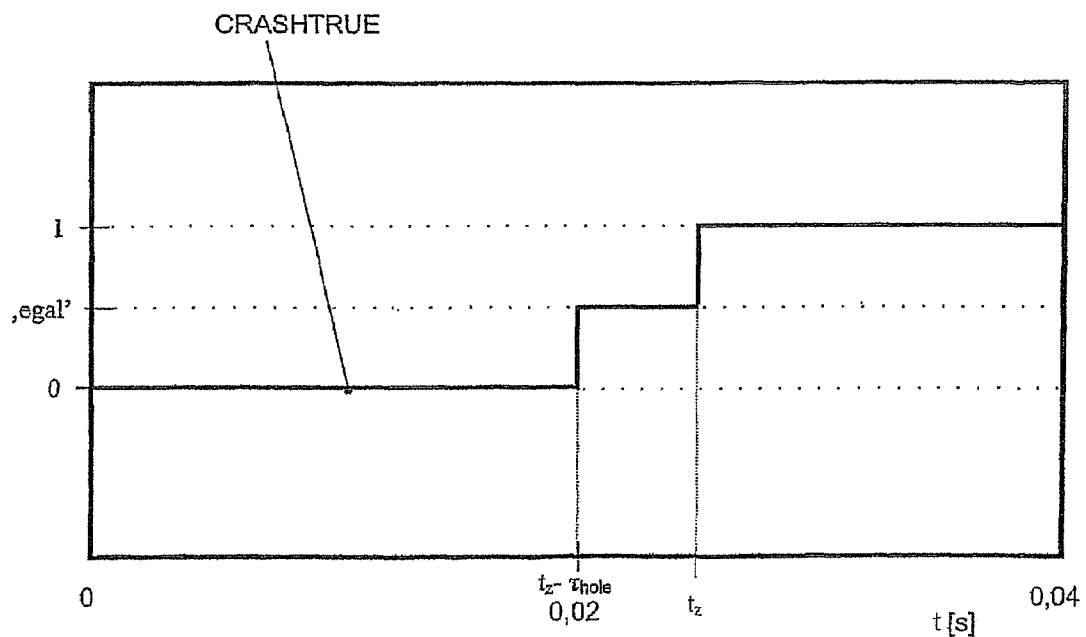
FIG. 15 illustrates a further triggering information item having a training-suppression time interval.

FIG. 14 and FIG. 15 illustrate an alternative procedure, which also disregards the pseudospeed values and triggering information item CRASHTRUE disregarded in training-suppression time interval $t_{hole}$, when triggering relationships 30A, 30B, 30C, and 30D are generated. In this context, the pseudospeed values are indeed also used in training-suppression time interval $t_{hole}$ prior to setpoint triggering time $t_z$ for generating triggering relationships 30A, 30B, 30C, and 30D, but a variable "no difference" is added to triggering information item CRASHTRUE in training-suppression time interval $t_{hole}$ prior to setpoint triggering time $t_z$, the variable "no difference" indicating that both a 0 and a 1 outputted by triggering relationships 30A, 30B, 30C, and 30D during a training instance are correct for ignition recommendation CRASH. This means that regardless of whether triggering relationships 30A, 30B, 30C, and 30D output 0 or 1 as ignition recommendation CRASH during the training or learning within training-suppression time interval $t_{hole}$, it is assumed that the solution is correct, i.e., that ignition recommendation CRASH is equal to triggering information item CRASHTRUE.

Using the database data modified according to the procedure described with reference to FIG. 12, FIG. 13, FIG. 14, and FIG. 15, triggering relationships 30A, 30B, 30C, and 30D are automatically generated with the objective that ignition recommendation CRASH is equal to triggering information item CRASHTRUE for the utilized data. To automatically generate triggering relationships 30A, 30B, 30C, and 30D in an arrangement as a neural network illustrated in FIG. 8, tools conventional for this may be used for generating neural networks.

For example, the routine "treefit" from the "Statistics Toolbox" of the program "MATLAB 7" from Mathworks may be used for automatically generating triggering relationships 30A, 30B, 30C, and 30D in an arrangement as a sequence of comparisons represented in Table 1, or in an arrangement as a decision tree 80 illustrated in FIG. 9. This program may be acquired at the Internet address www.mathworks.com/company/aboutus/contact_us/contact_sales.htm 1. Details about the "treefit" routine are provided at the Internet address www-.mathworks.com/access/helpdesk/help/toolbox/stats/treef-it.h tml.

The triggering relationship illustrated in FIG. 9 and Table 1 does not take pseudospeed value v3S1 into account. It is taken into account in the learning process, but is disregarded during the generation of the code illustrated in Table 1.

Step 91 is followed by an inquiry 92 as to whether triggering relationships 30A, 30B, 30C, and 30D generated in this manner are correct. To this end, triggering relationships 30A, 30B, and 30D are tested, using the database entries not utilized in step 91. If triggering relationships 30A, 30B, 30C, and 30D are correct, then inquiry 92 is followed by a step 93. Otherwise, step 91 is repeated under different conditions.

In step 93, triggering relationships 30A, 30B, 30C, and 30D are implemented in control unit 2. Control unit 2 is installed in motor vehicle 1, together with crash sensors S1, S2, and S3 and corresponding occupant protection devices such as airbag 15 or belt tensioner 16.

Although explained in connection with a binary triggering information item CRASHTRUE and a binary ignition recommendation CRASH, example embodiments of the present invention is also equally applicable to complex triggering information items and ignition recommendations. This is true for both the procedure described with reference to FIG. 12 and FIG. 13 and the procedure described with reference to FIG. 14 and FIG. 15.

In the preferred exemplary embodiment that is represented, pseudospeed values v0S1, v1S1, v2S1, v3S1, v0S2, and v0S3, i.e., the time averages of (measured) acceleration values aS1, aS2, aS3, are used as input variables and training variables of triggering relationships 30A, 30B, 30C, and 30D. The (measured) acceleration values aS1, aS2, aS3 and sampled acceleration values as1, as2, as3 may be used in the same manner as pseudospeed values v0S1, v1S1, v2S1, v3S1, v0S2, v0S3, as direct and not just indirect input variables and training variables of triggering relationships 30A, 30B, 30C, and 30D. This is also true for both the procedure described with reference to FIG. 12 and FIG. 13 and the procedure described with reference to FIG. 14 and FIG. 15. In a corresponding modification of the procedure described with reference to FIG. 12 and FIG. 13, (measured) acceleration values aS1, aS2, aS3 and/or scanned acceleration values as1, as2, as3 are removed from the training data of triggering relationships 30A, 30B, 30C, and 30D, in the area of training-suppression time interval $\tau_{hole}$.

Figure 16:
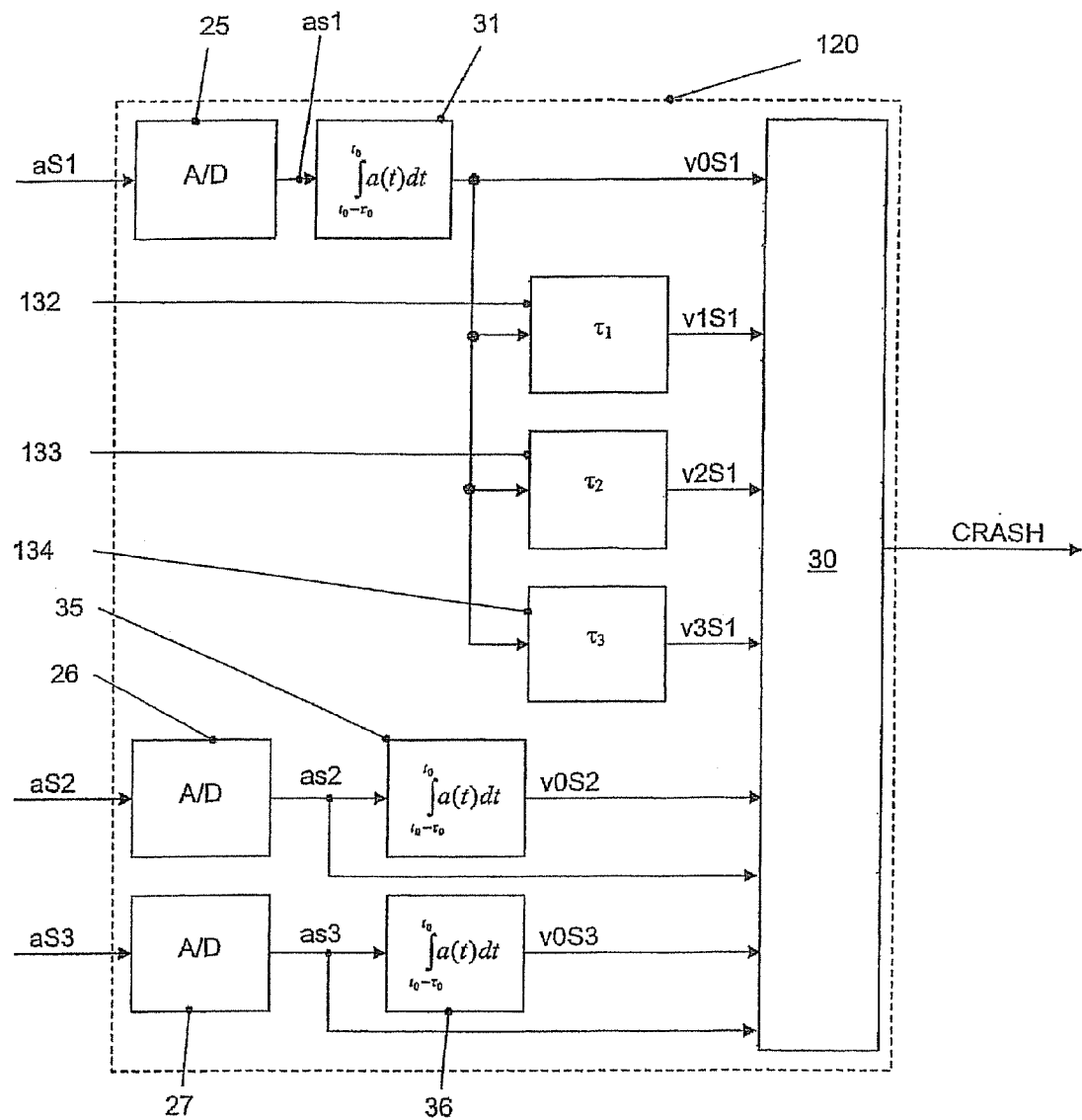
FIG. 16 illustrates a further exemplary embodiment of a triggering module.

FIG. 16 illustrates an exemplary embodiment of a triggering module 120 that is an alternative to triggering module 20. In this context, integrators 32, 33, and 34 are replaced by lag elements 132, 133, and 134, which are positioned such that pseudospeed value v1S1 results as pseudospeed value v0S1 delayed by time $\tau_1$, pseudospeed value v2S1 results as pseudospeed value v0S1 delayed by time $\tau_2$, and pseudospeed value v3S1 results as pseudospeed value v0S1 delayed by time $\tau_3$.

One example of a possible (simple) implementation of integrator 31 (that is also appropriately adapted for integrators 32, 33, and 34) is $$vS1(i) = c \cdot \Delta t \sum_{j=i-\frac{\tau_0}{\Delta t}}^{i} as1(j)$$

where i is a running index for specifying current time $t_0$, and is a constant. In this case, pseudospeed values v0S1, v1S1, v2S1, and v3S1 are yielded, for example, in accordance with the following relationships:

$$v0S1 = vs1(i)$$

$$v1S1 = vS1\left(i - \frac{\tau_1}{\Delta t}\right)$$

$$v2S1 = vS1\left(i - \frac{\tau_2}{\Delta t}\right)$$

and $$v3S1 = vS1\left(i - \frac{\tau_3}{\Delta t}\right).$$

Figure 17:
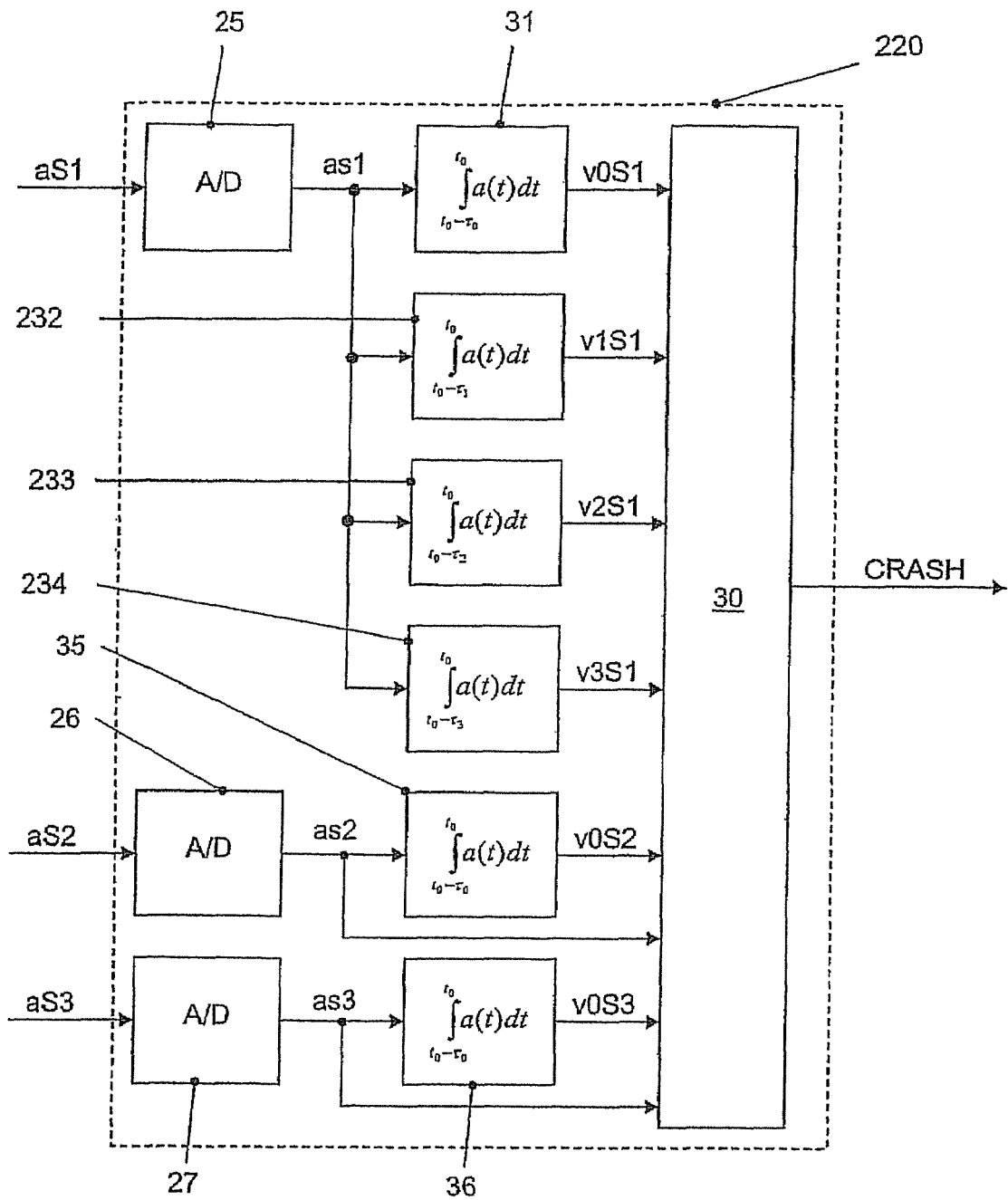
FIG. 17 illustrates a further exemplary embodiment of a triggering module.

FIG. 17 illustrates an exemplary embodiment of a triggering module 220 that is an alternative to triggering module 20. In this context, integrators 32, 33, and 34 are replaced by integrators 232, 233, and 234. In this context, pseudospeed value v1S1 is ascertained via integrator 232 according to $$v1S1 = \int_{t_0 - \tau_1}^{t_0} as1 \cdot dt$$

Using integrator 233, a pseudospeed value v2S1 at time $t_0$ is ascertained according to $$v2S1 = \int_{t_0 - \tau_2}^{t_0} as1 \cdot dt$$

Using integrator 234, a pseudospeed value v3S1 at a time $t_0$ is ascertained according to $$v3S1 = \int_{t_0 - \tau_3}^{t_0} as1 \cdot dt$$

Figure 18:
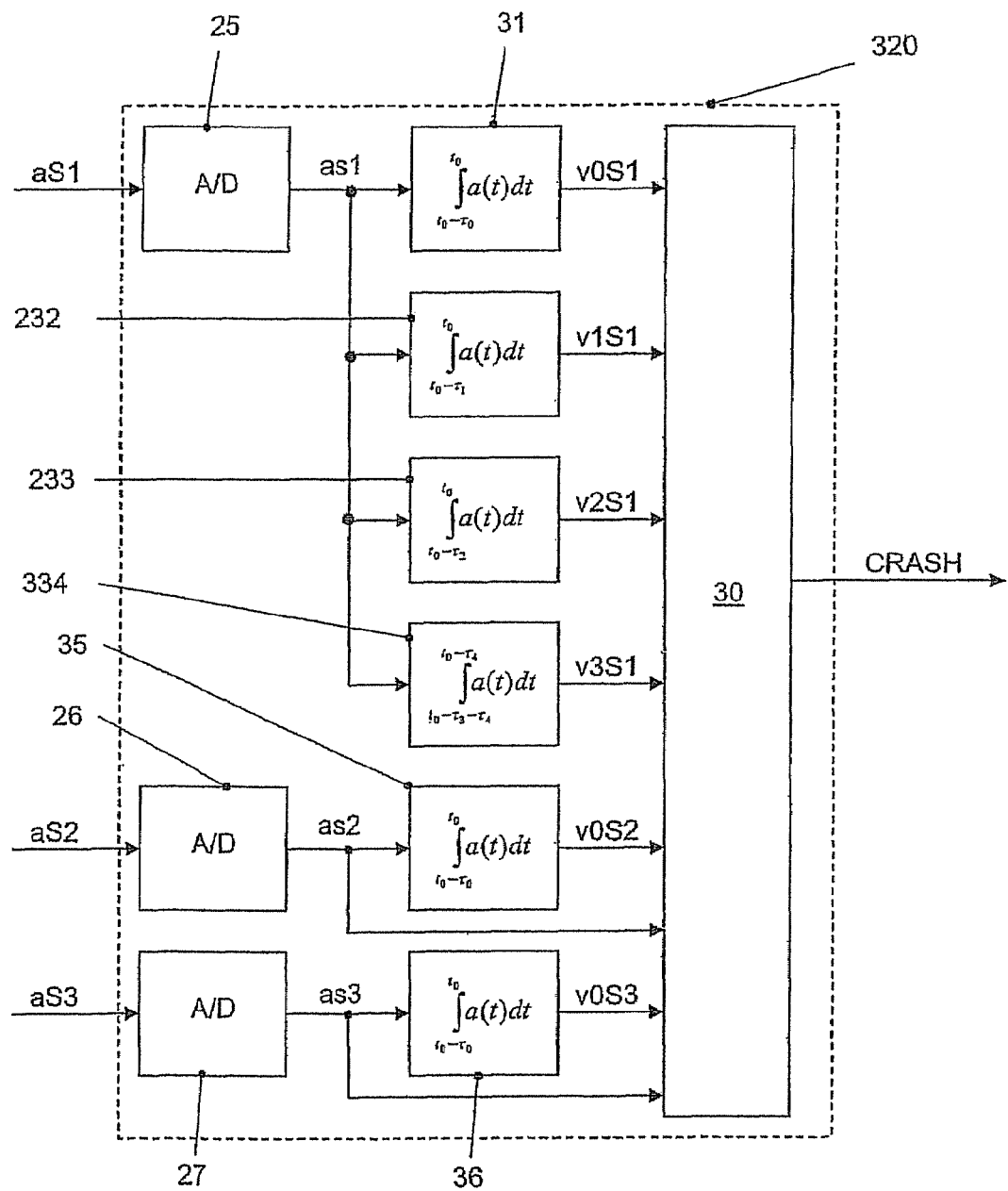
FIG. 18 illustrates a further exemplary embodiment of a triggering module.

In triggering module 20 illustrated in FIG. 4 and triggering module 120 illustrated in FIG. 16, the time intervals differ in their position. However, in triggering module 220 illustrated FIG. 17, the time intervals differ in their length. It may also be provided that time intervals differ in their length and in their position. A corresponding exemplary embodiment is illustrated in FIG. 18. FIG. 18 illustrates an exemplary embodiment of a triggering module 320 that is an alternative to triggering module 220. In this context, integrator 234 is replaced by an integrator 334, with the aid of which a pseudospeed value v3S1 at a time $t_0$-$\tau_4$ is ascertained according to $$v3S1 = \int_{t_0 - \tau_3 - t_4}^{t_0 - \tau_4} as1 \cdot dt$$

According to the foregoing, particularly robust triggering of airbags and belt tensioners may be provided.

Although explained in the exemplary embodiments with regard to airbags and belt tensioners for a frontal collision, example embodiments of the present invention should not, of course, be considered to be restricted to this case. Example embodiments of the present invention are also applicable to side airbags and other occupant protection systems. In one implementation for side airbags, crash sensors S2 and S3 may be arranged, for example, in the B-pillar. It may be provided that at least one pseudospeed value over at least one additional time interval be calculated for crash sensor S2 and/or crash sensor S3, as well.

Control unit 2 may also be a distributed system. A control unit within the present context does not have to be accommodated in a single housing. A control unit within the present context may also be an individual chip or a printed circuit board.

To the extent that decision trees are mentioned in connection with the generation of ignition recommendation CRASH, these may also be replaced by regression trees, association tables, rule sets, supervector machines, or other machine-learning procedures, etc.

Instead of motion variables or their average values, differences of motion variables, average values of these differences, and/or differences of average values may also be used. Thus, e.g., a subtractor may be provided in front of integrators 31, 32, 33, 34, 35, 36, 232, 233, 234, and 334 illustrated in FIG. 4, FIG. 16, FIG. 17, and/or FIG. 18, so that instead of sampled acceleration values as1, as2, as3, differential values Δas1, Δas2, Δas3 are input variables of integrators 31, 32, 33, 34, 35, 36, 232, 233, 234, and 334; Δas1 being equal to difference as1-as2, Δas2 being equal to difference as1-as3, and Δas3 being equal to difference as2-as3. In addition, it may be provided that differential value Δas1 be processed in the same manner as sampled acceleration value as1 illustrated in FIG. 4, FIG. 16, FIG. 17, and/or FIG. 18, that differential value Δas2 be processed in the same manner as sampled acceleration value as1 illustrated in FIG. 4, FIG. 16, FIG. 17, and/or FIG. 18, and/or that differential value 8 Δs3 be processed in the same manner as sampled acceleration value as2 illustrated in FIG. 4, FIG. 16, FIG. 17, and/or FIG. 18. In this case, the number of integrators and the number of input variables are to be appropriately adapted to trigger generator 30.

Differences may also be time differences. Thus, it may be provided that differential values Δas1, Δas2, Δas3 be used in place of sampled acceleration values as1, as2, as3 as input variables of integrators 31, 32, 33, 34, 35, 36, 232, 233, 234, and 334, Δas1(t) being equal to difference as1(t)-as1(t-τ), Δas2 being equal to difference as2(t)-as2(t-τ) or to difference as2(t)-as3(t-τ), and Δas3 being equal to difference as3(t)-as3(t-τ) or to difference as3(t)-as2(t-τ).

In accordance with above-mentioned variants with regard to the calculation of a difference, motion variables within the present context may also be differences of motion variables, when they are used as input variables.

One may proceed in an analogous manner with pseudospeed values v0S1, v1S1, v2S1, v3S1, v0S2, and v0S3. Accordingly, average values of motion variables within the present may also be differences of average values of motion variables or average values of differences of motion variables, when they are used as input variables.

LIST OF REFERENCE NUMERALS

| | |
|---|---|
| 1 | motor vehicle |
| 2 | control unit |

-continued

LIST OF REFERENCE NUMERALS

| | |
|---|---|
| 3 | crash zone |
| 4 | safety zone |
| 5, 6 | leads |
| 7, 8 | dotted line |
| 10 | control module |
| 11 | belt sensor |
| 12 | seat-occupancy sensor |
| 14 | control element |
| 15 | airbag |
| 16 | belt tensioner |
| 20, 120, 220, 320 | triggering module |
| 21 | firing table |
| 25, 26, 27 | analog-to-digital converter |
| 30 | trigger generator |
| 30A, 30B, 30C, 30D, 30E | triggering relationship |
| 31, 32, 33, 34, 35, 36, 232, 233, 234, 334 | integrator |
| 38 | selection module |
| 40 | time interval |
| 50, 51, 52, 53, 54 | input node |
| 60, 61, 62, 63, 64, 65 | covered node |
| 70 | output node |
| 80 | decision tree |
| 81, 82, 83, 84, 85, 86, 87, 88, 89, 92 | inquiry |
| 90, 91, 93 | step |
| 132, 133, 134 | lag element |
| AIR, BELT | ignition signal |
| aS1, aS2, aS3, as1, as2, as3, | acceleration value |
| CRASH | ignition recommendation |
| CRASHTRUE | triggering information item |
| ONOFF | switching signal |
| MBELT | belt information item |
| MSEAT | seat-occupancy information item |
| P3OA, P3OB, P3OC, P3OD | parameter |
| S1, S2, S3 | crash sensor |
| t | time |
| $t_0$ | current time |
| $t_z$ | setpoint triggering time |
| v0S1, v1S1 v2S1, v3S1 v0S2, v0S3 | pseudospeed value |
| $\tau_0$ | length of a time interval |
| $\tau_0, \tau_1, \tau_2, \tau_3$ | length of a time interval or time (delay) |
| $\tau_{hole}$ | training-suppression time interval |

What is claimed is:

1. A motor vehicle, comprising:
at least one first crash sensor arranged in a safety zone of the motor vehicle adapted to measure a motion variable of the motor vehicle;
at least one second crash sensor arranged in a crash zone of the motor vehicle adapted to measure a second motion variable of the motor vehicle;
an occupant protection device controllable via an ignition signal;
a control unit adapted to ascertain the ignition signal as a function of at least one of (a) the measured motion variables and (b) a time average of each measured motion variable over at least a first time interval;
at least one first triggering relationship adapted for ascertaining the ignition signal as a function of at least one of (a) the measured motion variables and (b) time averages of each measured motion variables over the first time interval; and
at least one second triggering relationship for ascertaining the ignition signal as a function of at least one of (a) the motion variable measured by the first crash sensor and (b) the time average of the motion variable measured by the first crash sensor over the first time interval but not as a function of either (a) the second motion variable measured by the second crash sensor or (b) the time average of the second motion variable over the first time interval;
wherein at least one of (a) the first triggering relationship and (b) the second triggering relationship is generated as a function of at least one of (a) the measured motion variables and (b) their time averages over one of (a) the first time interval and (b) the first time interval and the second time interval of a situation, for which a setpoint triggering time of the occupant protection device is known, but one of (a) the measured motion variables and (b) their time averages over one of (a) the first time interval and (b) the at least first time interval and the second time interval is disregarded in a training-suppression time interval one of (a) immediately prior to the setpoint triggering time of the occupant protection device or (b) immediately after the setpoint triggering time of the occupant protection device during the generation of one of (a) the first triggering relationship and (b) the second triggering relationship.

2. The motor vehicle according to claim 1, wherein the control unit includes a selection module adapted to select one of (a) the first triggering relationship and (b) the second triggering relationship to instantaneously ascertain the ignition signal.

3. The motor vehicle according to claim 1, wherein the control unit is adapted to ascertain the ignition signal as a function of a time average of the motion variable measured by the first crash sensor over a second time interval different from the first time interval.

4. The motor vehicle according to claim 3, wherein the time intervals are between 1 ms and 200 ms long.

5. The motor vehicle according to claim 1, wherein the control unit is adapted to ascertain the ignition signal in accordance with a pattern-recognition method.

6. The motor vehicle according to claim 1, wherein the control unit is adapted to ascertain the ignition signal in accordance with a pattern-recognition method and in accordance with at least one of (a) a neural network and (b) a decision tree.

7. A method for controlling at least one occupant protection device of a motor vehicle, comprising:
measuring a motion variable of the motor vehicle by at least one first crash sensor arranged in a safety zone of the motor vehicle;
measuring a second motion variable of the motor vehicle by at least one second crash sensor arranged in a crash zone of the motor vehicle;
ascertaining, by a control unit arranged in the motor vehicle, an ignition signal as a function of at least one of (a) the measured motion variables and (b) a time average of each measured motion variable over at least a first time interval;
controlling the occupant protection device in accordance with the ignition signal;
generating at least one first triggering relationship for ascertaining the ignition signal as a function of at least one of (a) the measured motion variables and (b) a time average of each measured motion variable over the first time interval; and
generating at least one second triggering relationship for ascertaining the ignition signal as a function of at least one of (a) the motion variable measured by the first crash sensor and (b) the time average of the motion variable over the at least first time interval but not as a function of either (a) the second motion variable measured by the second crash sensor or (b) the time average of the second motion variable over the first time interval;

wherein at least one of (a) the first triggering relationship and (b) the second triggering relationship is generated in the corresponding generating step as a function of at least one of (a) the measured motion variables and (b) their time averages over one of (a) the first time interval and (b) the first time interval and the second time interval of a situation, for which a setpoint triggering time of the occupant protection device is known, but one of (a) the measured motion variables and (b) their time averages over one of (a) the first time interval and (b) the at least first time interval and the second time interval is disregarded in a training-suppression time interval one of (a) immediately prior to the setpoint triggering time of the occupant protection device or (b) immediately after the setpoint triggering time of the occupant protection device during the generation of one of (a) the first triggering relationship and (b) the second triggering relationship.

8. The method according to claim 7, wherein at least one of (a) the first triggering relationship and (b) the second triggering relationship is automatically generated in the corresponding generating step as a plurality of comparisons of one of (a) the motion variables and (b) their time averages over one of (a) the first time interval and (b) the first time interval and a second time interval different from the first time interval, to a plurality of limiting values.

9. The method according to claim 8, further comprising:
automatically ascertaining the limiting values;
automatically setting a number of comparisons;
automatically selecting an order of the comparisons;
automatically selecting for a comparison: one of:
(a) one of (a) a measured motion variable and (b) its time average over one of (a) the first time interval and (b) the first time interval and the second time interval; and
(b) an age of one of (a) the motion variables and (b) their time averages over one of (a) the first time interval and (b) the first time interval and the second time interval.

10. The method according to claim 7, wherein the ignition signal is ascertained in the ascertaining step in accordance with a pattern-recognition method.

11. The method according to claim 7, wherein the ignition signal is ascertained in the ascertaining step in accordance with a pattern-recognition method and in accordance with at least one of (a) a neural network and (b) a decision tree.

* * * * *